US011721036B2

(12) United States Patent
Muta et al.

(10) Patent No.: US 11,721,036 B2
(45) Date of Patent: Aug. 8, 2023

(54) IMAGE PROCESSING APPARATUS, IMAGE PROCESSING METHOD, AND COMPUTER-READABLE MEDIUM

(71) Applicant: CANON KABUSHIKI KAISHA, Tokyo (JP)

(72) Inventors: Hajime Muta, Zama (JP); Yasuo Bamba, Tokyo (JP); Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 17/021,297

(22) Filed: Sep. 15, 2020

(65) Prior Publication Data
US 2021/0082141 A1    Mar. 18, 2021

(30) Foreign Application Priority Data
Sep. 17, 2019    (JP) ............................. JP2019-168734

(51) Int. Cl.
*G06N 3/08* (2023.01)
*G06T 7/73* (2017.01)
*G06T 7/246* (2017.01)
*G06T 7/00* (2017.01)

(52) U.S. Cl.
CPC ................. *G06T 7/73* (2017.01); *G06N 3/08* (2013.01); *G06T 7/246* (2017.01); *G06T 7/97* (2017.01)

(58) Field of Classification Search
CPC .. G06T 7/73; G06T 7/246; G06T 7/97; G06T 2207/10016; G06T 2207/20084; G06T 2207/30196; G06T 2207/30242; G06T 7/70; G06N 3/08

USPC ............................................. 382/103; 348/46
See application file for complete search history.

(56) References Cited

U.S. PATENT DOCUMENTS

2016/0088288 A1\* 3/2016 Liu ...................... H04N 13/271
348/46
2019/0303677 A1\* 10/2019 Choutas ................. G06V 40/20

FOREIGN PATENT DOCUMENTS

| CN | 110210603 A | 9/2019 |
| JP | 2007201556 A | 8/2007 |
| JP | 2009211311 A | 9/2009 |

OTHER PUBLICATIONS

Extended European Search Report issued in European Appln. No. 20196124.0 dated Jan. 29, 2021.
Ren. "Fusing Crowd Density Maps and Visual Object Trackers for People Tracking in Crowd Scenes." IEEE/CVF Conference on Computer Vision and Pattern Recognition. 2018: pp. 5353-5362. Cited in NPL 1.

(Continued)

*Primary Examiner* — Charlotte M Baker
(74) *Attorney, Agent, or Firm* — Rossi, Kimms & McDowell LLP

(57) ABSTRACT

There is provided with an image processing apparatus. An obtaining unit obtains a moving image including a plurality of images. A density estimating unit estimates a density distribution of a target object based on an image of the plurality of images. A position estimating unit estimates a position of the target object in the image based on the density distribution. A measuring unit measures a flow of the target object from positions of the target object in the plurality of images.

17 Claims, 12 Drawing Sheets

(56) References Cited

OTHER PUBLICATIONS

Kang. "Beyond Counting: Comparisons of Density Maps for Crowd Analysis Tasks-Counting, Detection, and Tracking." IEEE Transactions on Circuits and Systems for Video Technology. May 2019: pp. 1408-1422. vol. 29, No. 5. Cited in NPL 1.

Rani. "Robust Object Tracking Using Kernalized Correlation Filters (KCF) and Kalman Predictive Estimates." 2nd IEEE International Conference on Recent Trends in Electronics Information & Communication Technology (RTEICT). May 19-20, 2017: pp. 587-591. Cited in NPL 1.

Zheng. "Cross-Line Pedestrian Counting Based on Spatially-Consistent Two-Stage Local Crowd Density Estimation and Accumulation." IEEE Transactions on Circuits and Systems for Video Technology. Mar. 2019: pp. 787-799. vol. 29, No. 3. Cited in NPL 1.

* cited by examiner

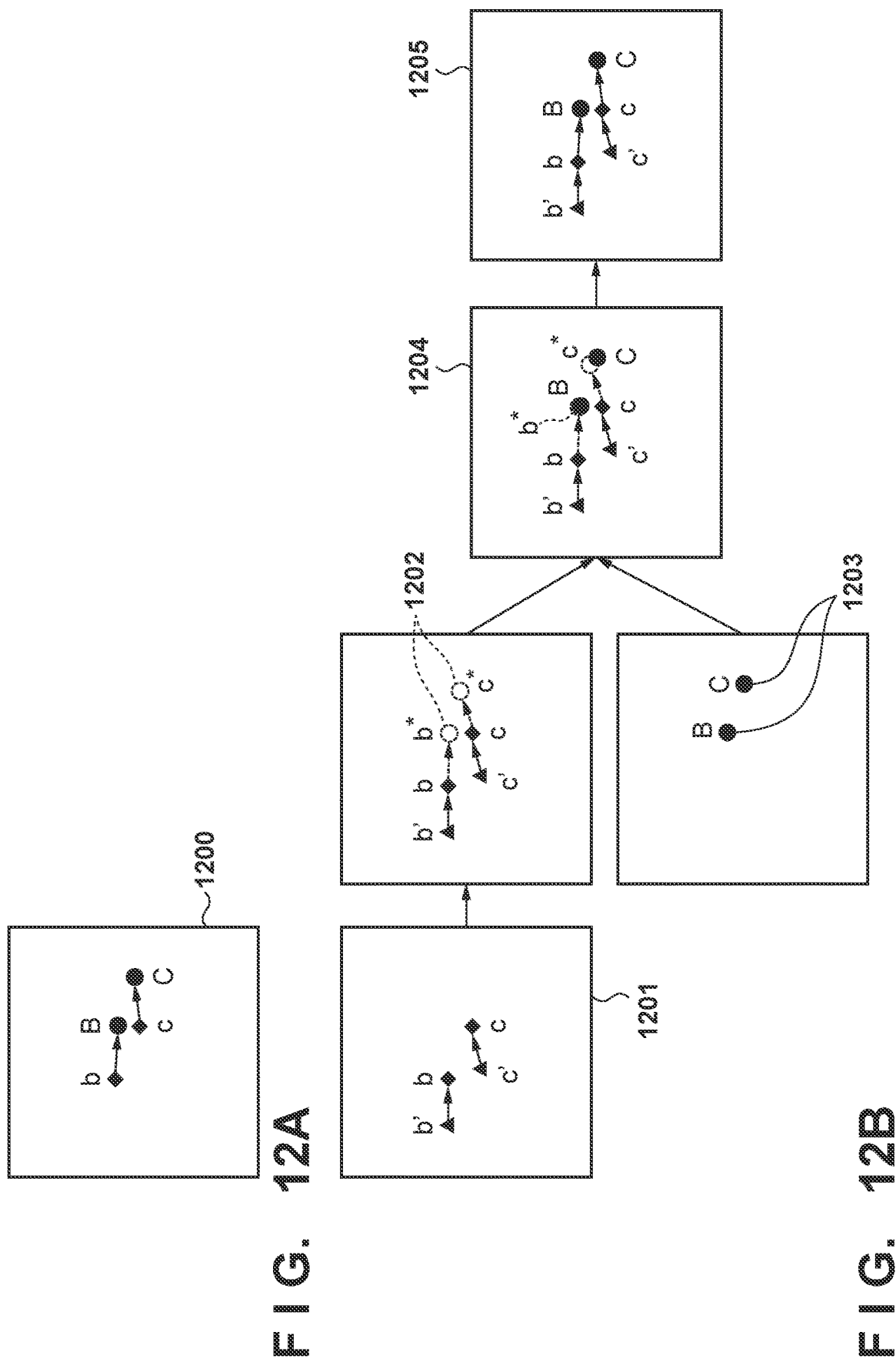

IMAGE PROCESSING APPARATUS, IMAGE PROCESSING METHOD, AND COMPUTER-READABLE MEDIUM

BACKGROUND OF THE INVENTION

Field of the Invention

The present invention relates to an image processing apparatus, an image processing method, and a computer-readable medium, and more specifically, to an analyzing technique for a moving image captured by a video camera, a security camera, or the like.

Description of the Related Art

Recently, devices for analyzing a flow (for example, the number of people or directions of people) of target objects (For example, people) in an image-captured region from a moving image captured by a camera or the like, that is, devices for analyzing a flow of people have been proposed. In order to measure a flow of target objects, it is necessary to detect the target objects from the moving image. Japanese Patent Laid-Open No. 2007-201556 discloses a method for detecting person regions included in an image captured by a fixed-point camera, and measuring the number of people.

SUMMARY OF THE INVENTION

According to an embodiment of the present invention, an image processing apparatus comprises: an obtaining unit configured to obtain a moving image including a plurality of images; a density estimating unit configured to estimate a density distribution of a target object based on an image of the plurality of images; a position estimating unit configured to estimate a position of the target object in the image based on the density distribution; and a measuring unit configured to measure a flow of the target object from positions of the target object in the plurality of images.

According to another embodiment of the present invention, an image processing method comprises: obtaining a moving image including a plurality of images; estimating a density distribution of a target object based on an image of the plurality of images; estimating a position of the target object in the image from the density distribution; and measuring a flow of the target object from positions of the target object in the plurality of images.

According to still another embodiment of the present invention, a non-transitory computer-readable medium stores a program which, when executed by a computer, causes the computer to perform a method comprising: obtaining a moving image including a plurality of images; estimating a density distribution of a target object based on an image of the plurality of images; estimating a position of the target object in the image from the density distribution; and measuring a flow of the target object from positions of the target object in the plurality of images.

Further features of the present invention will become apparent from the following description of exemplary embodiments (with reference to the attached drawings).

BRIEF DESCRIPTION OF THE DRAWINGS

FIGS. 12A and 12B are views illustrating a matching method based on estimated position of a person.

DESCRIPTION OF THE EMBODIMENTS

Figure 1:
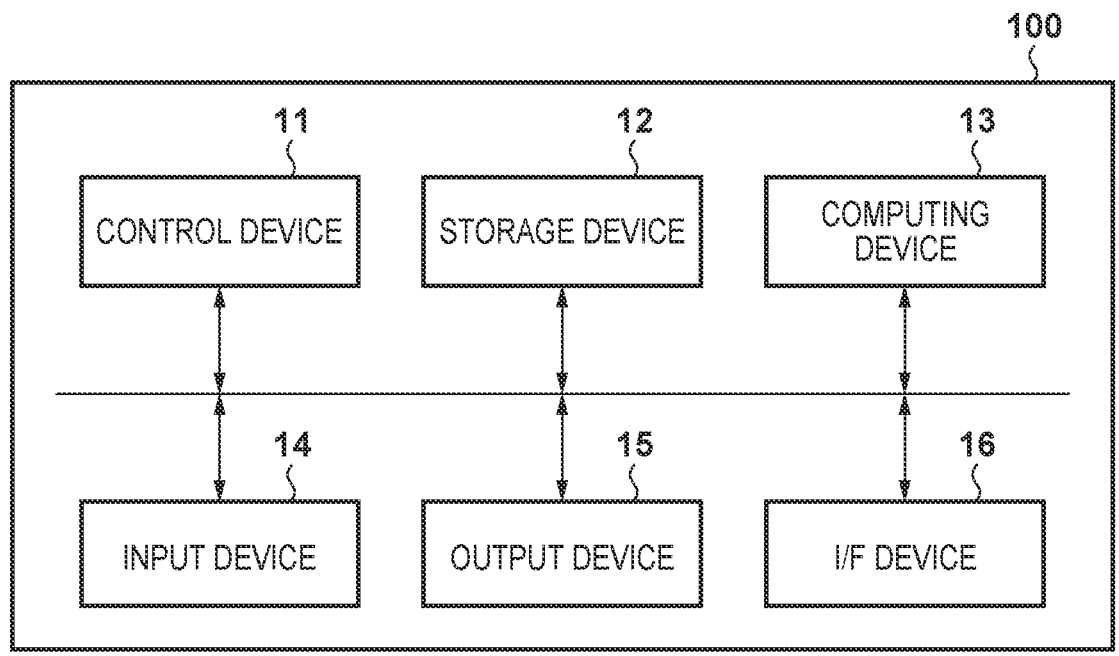
FIG. 1 is a view illustrating one example of a hardware configuration of an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In order to measure, with good accuracy, a flow of target objects at a scene with a crowd of target objects (crowded scene) such as a case of capturing an image of a crowd of people, it is necessary to detect, with good accuracy, positions of the target objects in such a scene. On the other hand, Japanese Patent Laid-Open No. 2007-201556 is so configured that a region occupied with a person is detected to detect the presence of the person. In this method, accuracy for detecting a person will be deteriorated when overlapping of persons becomes large. Thus, this method is such that accuracy for measuring a flow in a crowded scene is low.

An embodiment of the present invention can improve the accuracy for measuring a flow of target objects in a crowded scene.

FIG. 1 illustrates one example of a hardware configuration of an image processing apparatus 100 according to one embodiment of the present invention. The image processing apparatus 100 includes a control device 11, a storage device 12, a computing device 13, an input device 14, an output device 15, and an I/F (interface) device 16.

The control device 11 is a device configured to control the whole image processing apparatus 100. The storage device 12 stores therein programs and data necessary for operations performed by the control device 11. The computing device 13 is configured to perform necessary computing processes under control of the control device 11. For example, the computing device 13 may be configured to perform neural network computing described later. The input device 14 is a human interface device or the like, and configured to receive an input by user's operation. The output device 15 is a display device or the like, and configured to present a processing result generated by the image processing apparatus 100, or the like to a user.

The I/F device 16 may be a wired interface such as a universal serial bus, Ethernet® or an optical cable, or a wireless interface such as Wi-Fi or Bluetooth®. Via the I/F device 16, another device can be connected to the image processing apparatus 100. For example, an image capturing device such as a camera can be connected to the IF device 16, so that the image processing apparatus 100 can obtain a captured image via the I/F device 16. As another example, the image processing apparatus 100 can transmit a processing result to an external device via the I/F device 16. As still another example, the image processing apparatus 100 can obtain, via the/F device 16, a program, data, or the like necessary for an operation.

Functions of the image processing apparatus 100 described later can be realized, for example, by a processor (for example, the control device 11) operating according to a program on a memory (for example, the storage device 12). The storage device 12 or another recording medium can store therein such a program. However, at least part of the functions of the image processing apparatus 100 described later may be realized by hardware configured for the at least part of the functions. Moreover, an image processing apparatus according to the present invention may be realized as a combination of a plurality of devices connected with each other via a network, for example.

Figure 2:
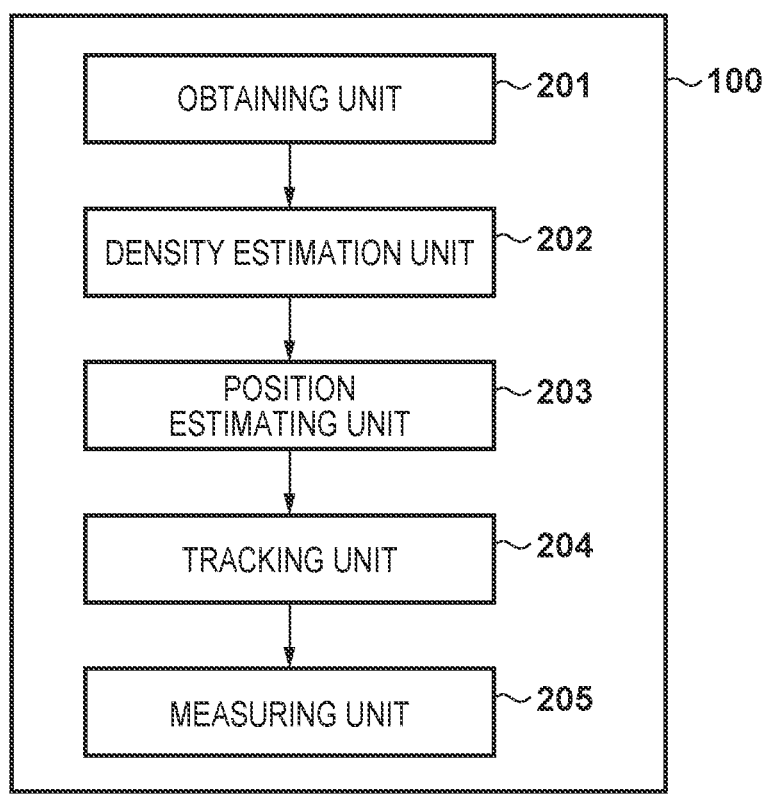
FIG. 2 is a view illustrating one example a functional configuration of the image processing apparatus.

FIG. 2 illustrates one example of a functional configuration of the image processing apparatus 100 according to one embodiment of the present invention. The image processing apparatus 100 includes, as functional elements, an obtaining unit 201, a density estimating unit 202, a position estimating unit 203, a tracking unit 204, and a measuring unit 205.

The obtaining unit 201 is configured to obtain a moving image including a plurality of images. The moving image thus obtained by the obtaining unit 201 is analyzed to measure a flow of target objects. The flow of target objects may be a flow of target objects on the images, or a flow of target objects in a real space estimated by image analysis. Note that the target objects to be analyzed are not particularly limited, and examples of the target objects include people, vehicles such as bicycles and motorcycles, automobiles such as cars and trucks, and animals such as livestock.

The moving image may be streaming, a moving image file, a series of image files stored per frame, a moving image stored on a medium, or the like, and these include a plurality of images as frame images. The plurality of images may be, for example, images captured at different times by an image capturing device installed at the same place. The obtaining unit 201 can obtain a moving image from a solid state image sensor such as a CMOS sensor or a CCD sensor, or an image capturing device, such as a camera, equipped with such a solid state image sensor. Moreover, the obtaining unit 201 may obtain a moving image data from a storage device such as a hard disk or SSD, or from storage medium or the like.

The density estimating unit 202 is configured to estimate, in the image obtained by the obtaining unit 201, a density distribution of the target objects whose flow is to be measured. The density distribution represents a portion in the image at which the target objects for the flow measurement (for example, heads of people) are estimated to be present. The density distribution can indicate a region in the image where the target objects is estimated to be present. The density distribution may be, for example, a uniform distribution that is centered at a position where the target object is present with a high probability, and may be sized according to the size of the target object. Moreover, the density distribution may be any distribution which has a maximum value at a position where the target object is present with a high probability. Examples of the latter includes Gaussian distribution. The density distribution may indicate the probability that the target object is present. The density estimating unit 202 is capable of outputting, as information indicating the density distribution, a density map representative of the density of the target objects at each position in the image. Note that a resolution of the density map may be equal to or lower than that of the image.

In case where target objects overlap each other in the image, the density estimating unit 202 may work out a density distribution in which density distributions respectively corresponding to the target objects are overlapped. This density distribution may be standardized such that a sum total of the densities in density distributions corresponding to one target object is 1. In this case, the sum total of the densities in the density distributions generated by the density estimating unit 202 corresponds to the number of target objects in the image.

Various methods are available as a method of estimating the density distribution by the density estimating unit 202. For example, the density estimating unit 202 may input an image or features extracted from the image, or both the image and the feature into a neural network. Examples of such a neural network include convolutional neural network, deconvolutional neural network, autoencoder in which the convolutional and deconvolutional neural networks are connected, a network with a short-cut such as U-Net, and the like. The neural network used by the density estimating unit 202 has been trained so that the neural network will output a density distribution of target objects if an image is inputted in the neural network. For example, the training may be carried out with an image for training and training data indicating a density distribution of the image like the above. For example, the training may be carried out in such a way that a sum total of output values from the neural network is equal to the number of the target objects, that is, the output values indicate density of the target objects at each position.

The position estimating unit 203 is configured to estimate positions of the target objects in the image from the density distribution obtained from the density estimating unit 202. For example, the position estimating unit 203 may be configured to output coordinates of the positions of the target objects thus estimated. The coordinates of the positions of the target objects are representative points of the target objects in the image. The representative points of the target objects may be head centers of people measured as the target objects.

A method of estimating the positions by the position estimating unit 203 is not particularly limited, and the position estimating unit 203 may estimate a center of gravity of the density distribution as the position of a target object, for example. On the other hand, the density estimating unit 202 would possibly provide an unclear border of a density distribution corresponding to one target object, and such borders would have various shapes. Furthermore, there is a possibility that, as a result of overlapping of density distributions corresponding to one target object, the density distributions thus overlapping would have a complicated shape. Furthermore, the density estimating unit 202 would possibly provide an unexpected output under a certain situation. In one embodiment, the position estimating unit 203 is configured to estimate the positions of the target objects by using a neural network. The use of neural network makes it possible to obtain a result of the position estimation with a predetermined constant computation amount regardless of the density distribution thus inputted. Therefore, the position estimating unit 203 is capable of dealing with various density distributions outputted from the density estimating unit 202.

For example, the neural network used by the position estimating unit 203 may be configured such that, if a density map indicating the density distribution is inputted, the neural network outputs a position map that indicates estimation results of two-class classifications of each position on the density map by probability. In this way, the position estimating unit 203 can perform such two-class classification that distinguishes, for each of the positions in the image, whether or not the position represents a representative point of a target object. In this two-class classification, if the position on the density map indicates positional coordinates of a target object, the estimation result for the position is 1, and if the position on the density map does not indicate positional coordinates of a target object, the estimation result for the position is 0. The positional map 701 may indicates probabilities for each position on the density map as to whether or not the position indicates the positional coordinates of the target objects. Such positional map is so sparse that most of elements thereof are 0. Thus, with the two-class classification problem capable of dealing with sparse output, it becomes easier to carry out the training of the neural network for generating such a position map.

Examples of such a neural network include convolutional neural network, deconvolutional neural network, autoencoder in which the convolutional and deconvolutional neural networks are connected, a network with a short-cut such as U-Net, and the like. Moreover, the neural network used by the position estimating unit 203 may have an output layer having a value area more than 0 but less than 1. Examples of such an output layer include step function, sigmoid function, SoftMax function, and the like. A neural network with such an output layer can provide an output suitable of the two-class classification problem.

The neural network used by the position estimating unit 203 has been trained in advance, so that the neural network will output the positions of the target objects if a density map is inputted therein. Such training may be carried out with, for example, a density map for training and training data representative of a density map in which elements corresponding to positions of people are 1 and the other elements are 0.

The measuring unit 205 is configured to measure a flow of target objects from the positions of the target objects in a plurality of images, the positions being estimated by the position estimating unit 203. For example, the measuring unit 205 may be capable of measuring a flow rate of target objects or directions of flows of target objects. The flow rate may be, for example, the number of target objects passing a preset measuring region or measuring line. For example, the measuring unit 205 may be configured to measure the number of target objects that have moved from one region to the other region, where the regions are segmented by the measuring region. The measuring unit 205 may be configured to measure the number of the target objects crossing the measuring line, if the measuring region is a line (measuring line).

Such a measuring region may be set in advance on the basis of an image-capturing scene. In this case, the measuring unit 205 may be configured to obtain, from a memory such as the storage device 12, a predetermined setting value of the measuring region. Moreover, the measuring unit 205 may be configured to obtain a setting value that is inputted by a user by operating a human interface device or the like connected to the input device 14, referring to the image displayed on the output device 15.

The measuring region may be one or plural measuring regions. Moreover, the shape of the measuring region is not particularly limited, and may be, for example, a polygonal line, a curve line, a polygonal shape, a circular shape, an oval shape as appropriate, or any shape constituted by a closed curved line. Moreover, the measuring region may be a line without a large thickness, or a line with a large thickness (or a longitudinal rectangular shape). Such a measuring region may be set according to a freely-selected guide shape that may be a line, a rectangular shape, or the like. For example, a shape according to such a guide shape may be provided at a certain position in the image. Such a guide shape may be one or plural guide shapes. Moreover, the guide shape may be extendable by widening its width or the like.

The method of measuring a flow of the target objects on the basis of the positions of the target objects is not particularly limited, but the present embodiment is configured such that the measuring unit 205 measures the flow by using tracking results of the target objects obtained by tracking unit 204. The tracking unit 204 is configured to track the positions of the target objects. The tracking unit 204 may be configured to track the positions of the target objects on the basis of the positions of the target objects thus estimated by the position estimating unit 203. For example, the tracking unit 204 may be configured to perform the tracking such that, based on the positions of the target objects estimated for the plurality of images, the tracking unit 204 tracks a changes of the position over time of a target object that is estimated as being identical.

In one embodiment, the tracking unit 204 is configured to obtain movement loci of the target objects by tracking the positional coordinates of the target objects on the basis of the positional coordinates of the target objects thus outputted by the position estimating unit 203. The tracking unit 204 is capable of associating a position of a target object in a first image at a first time among the plurality of images, and a position of the target object in a second image at a second time among the plurality of images. By repeating such associating, the tracking unit 204 can obtain the movement locus of the target object.

For example, the tracking unit 204 may be configured to perform the tracking by using a positional coordinates list of the target objects in images at different times. For example, the density estimating unit 202 and the position estimating unit 203 may perform the processes described above to each of the plurality of images captured at the same place with the same angle of view but at different times, thereby preparing the positional coordinates list of the target objects for each of the plurality of images. The tracking unit 204 may be configured to obtain the movement locus of a target object by matching the positional coordinates of the target object on a positional coordinates list for a time with the positional coordinates of the target object on a positional coordinates list for another time. In this case, the measuring unit 205 can measure the flow rate of the target objects by determining, for example whether or not the movement locus cross the measuring line. A concrete process examples will be described below, referring to FIG. 3.

Figure 3:
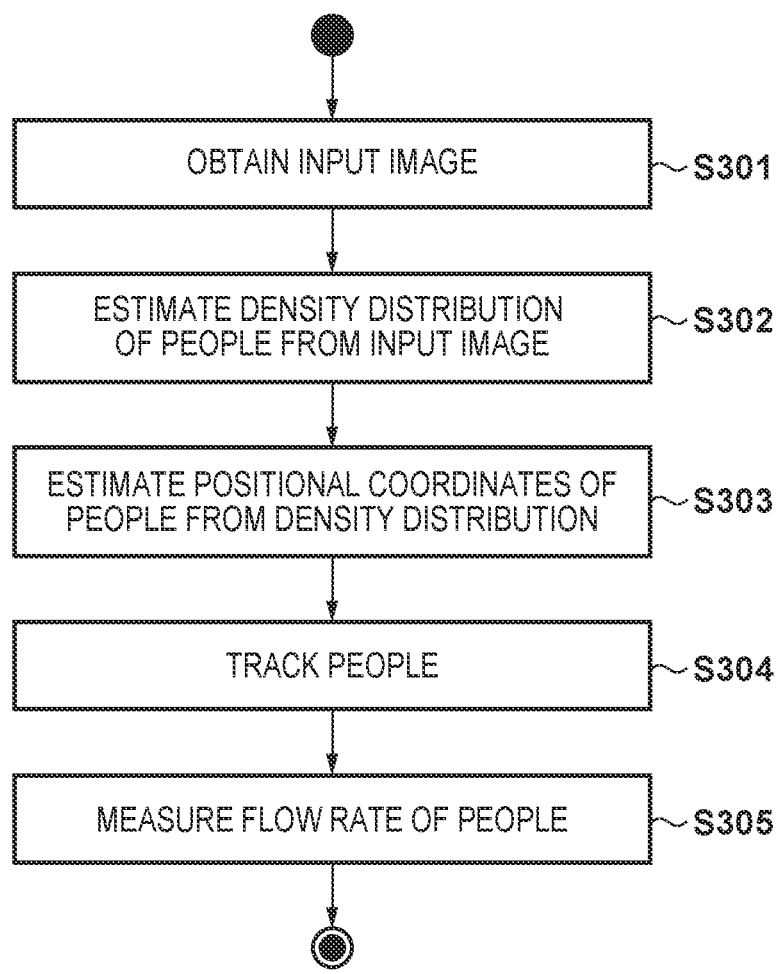
FIG. 3 is a view illustrating one example of a flow of process of the image processing apparatus.

One process example of the image processing apparatus 100 according to the present embodiment will be described, referring to FIG. 3. In the following, one example in which a flow rate of people is measured will be described. More specifically, the number of people crossing a preset measuring region is measured.

At Step S301, the obtaining unit 201 obtains a moving image. Moreover, the obtaining unit 201 obtains, from the moving image, a plurality of image for use in measuring the flow rate. For example, the obtaining unit 201 may be so configured to obtain the plurality of images captured respectively at plural times between a measurement start time to a measurement end time. Note that, the obtaining unit 201 may be so configured to obtain frame images from the image capturing device. In the following, each of the plurality of images obtained at Step S301 is referred to as an input image. The processes at Steps S302 and S303 are carried out for each of the input images.

The obtaining unit 201 may extract one or plural partial images from an input image. The obtaining unit 201 may extract one or more partial images from each of the plurality of images, the one or more partial images being part of an image. By using a partial image smaller in size than the input image, it is possible to reduce a process amount after Step S302. This configuration would facilitate real-time measurement of the flow rate. A region of the input image from which region the partial image is to be extracted (partial region) may be preset. The region (partial region) from which the partial image is to be extracted may be set by a user. For example, it may be configured such that the user operates the human interface device or the like connected to the input device 14 so as to set a partial region on the input image displayed on the output device 15. A method of setting the region from which the partial image is to be extracted, and a concrete shape of the region are not particularly limited. For example, the obtaining unit 201 may automatically determine, on the basis of a region designated by the user, the partial region to be extracted. As described above, the obtaining unit 201 may obtain a user designation as to the measuring region. In this case, the obtaining unit 201 may automatically determine, on the basis of the measuring region thus designated, the partial region to be extracted. For example, the obtaining unit 201 may extract the partial image from the input image in such a way that the partial image includes the measuring region.

Figure 4A:
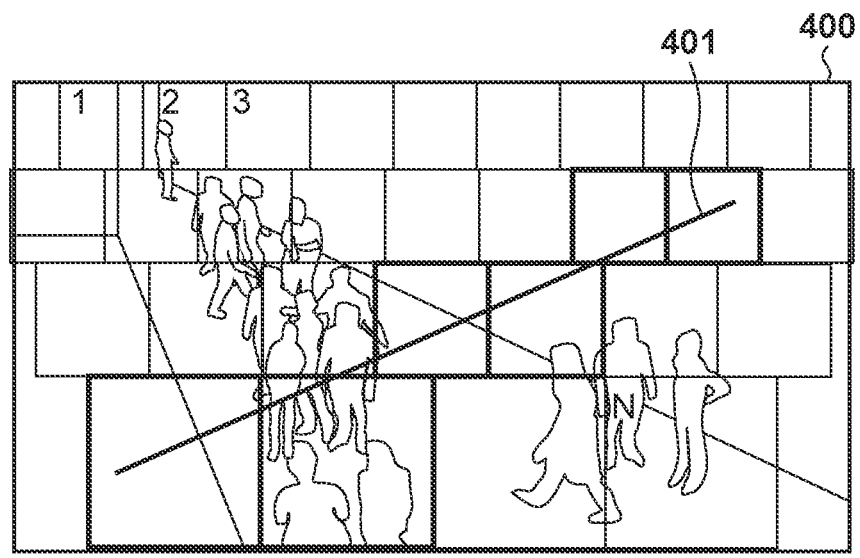
FIGS. 4A and 4B are views illustrating one example of a method for extracting a partial image from an input image.
Figure 4B:
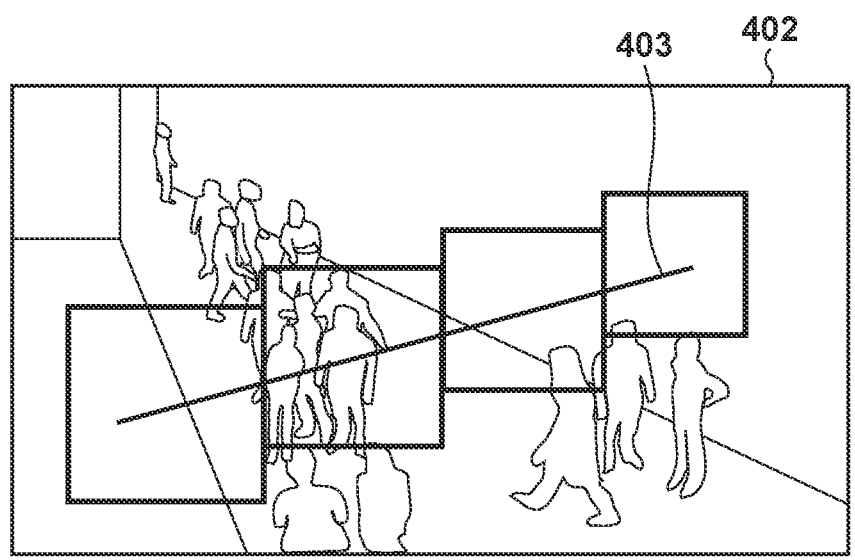

Moreover, the obtaining unit 201 may be so configured to divide a whole input image 400 into a plurality of subregions, as illustrated in FIG. 4A. In this case, the obtaining unit 201 may extract a partial image from each of one or more subregions selected from among the plurality of subregions. For example, in case where a measuring region 401 is set in the input image 400 as illustrated in FIG. 4A, the partial image to be used for the measurement of the flow rate may be extracted from the rectangular region illustrated with a thick frame surrounding the rectangular region and including the measuring region 401. Moreover, as illustrated in FIG. 4B, one or more rectangular regions each including a measuring region 403 may be set in part of the input image 402. From the rectangular regions thus set, the partial images to be used for the measurement of the flow rate may be extracted.

Even though the partial images in FIGS. 4A and 4B are rectangular, the shape of the partial image may be, for example, a polygonal shape, a circular shape, an oval shape as appropriate, or any shape constituted with a closed curved line. Moreover, if the shape of the measuring region is not a line but a polygonal line, a curve line, a polygonal shape, a circular shape, an oval shape as appropriate, or any shape constituted by a closed curved line, the partial image can be extracted in a similar manner.

Within an input image obtained by an image capturing device such as a camera, the people to be measured would be pictured with different sizes depending on where the people are positioned. Thus, the size of the partial images may be varied according to the positions within the image. For example, the sizes of the partial images may be set in such a way that a ratio of the sizes of the partial image and the size of people will become substantial constant, and the partial images may be extracted according to the sizes. Here, the sizes of people may be sizes of body parts including the heads and shoulders of the people, sizes of the heads of the people, sizes of the whole bodies of the people, or the like. FIGS. 4A and 4B illustrate an example in which the size of the partial image is varied in this way. That is, in FIGS. 4A and 4B, regions in which people pictured are positioned farer, that is, in the upper portion of the input image, the size of the partial image is smaller.

If the partial images are set as such, the processes at Step S302 and S303 may be carried out to each of the partial images within the input image. That is, the density estimating unit 202 may estimate the density distribution of the target objects in each of the partial images, and the position estimating unit 203 may estimate the positions of the target objects from the density distributions of each of the partial images. On the other hand, accuracy of the results of estimations at Step S302 and S303 tend to be lower in border regions (peripheral regions) around the partial images. Thus, in one embodiment, it may be configured such that a center region is defined in the partial image, so that people detected in the center region are subjected to the measurement of the flow rate at Step S305. This configuration performs the measurement of the flow rate by using a highly-accurate detection result of people, thereby improving the accuracy of the measurement.

Figure 5A:
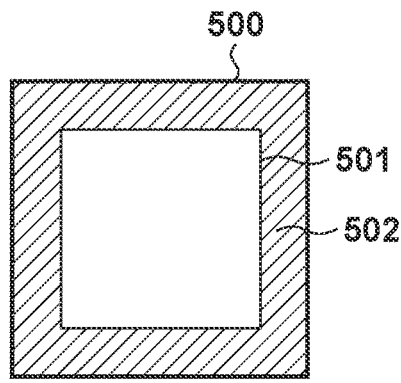
FIGS. 5A to 5D are views for explaining a center region and a margin region of the partial image.

One example of a method of defining the center region in the partial image includes, as illustrated in FIG. 5A, defining a center region 501 and a margin region 502 inside the partial image 500, the margin region 502 being surrounded by a border line of the partial image 500 and a border line of the center region 501. In the example illustrated in FIG. 5A, the center region 501 is rectangular but the shape of the center region 501 is not particularly limited. For example, the shape of the center region 501 may be any shape that can be included inside the partial image 500 such as a polygonal shape, a circular shape, an oval shape, or any closed curve line.

Figure 5B:
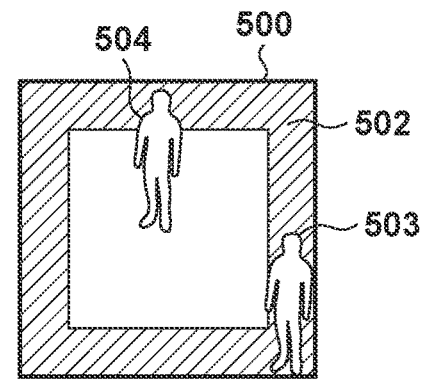

The size of the margin region may be set according to the sizes of people to be subjected to the measurement of the flow rate. For example, the margin region may be set to have such a size that can include therein a body part necessary to detect the people. FIG. 5B illustrates one of such examples. In FIG. 5B, the margin region 502 of the partial image 500 is set to such a size that can include therein a body part necessary to detect a person 503 or a person 504, which are to be subjected to the measurement of the flow rate. More specifically, the size of the margin region is set to such a size that can include therein the head and shoulders of the person. As another example, the margin region may be set in such a way that the margin region will be big enough to include therein the head of the person but not including the shoulders, or will be big enough to include therein the whole body of the person.

Figure 5C:
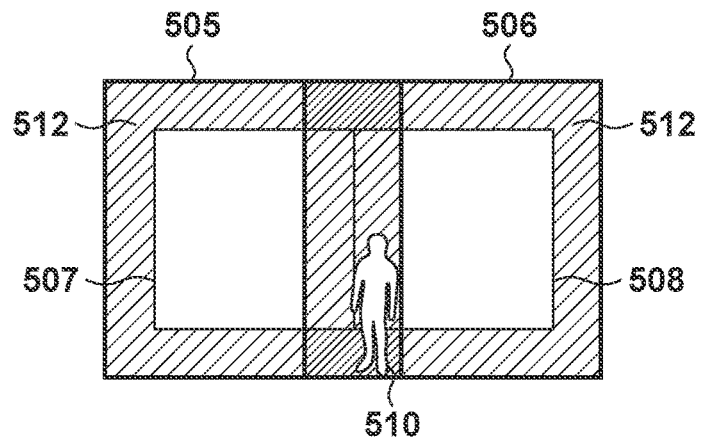

In case where a plurality of partial images is to be extracted from an input image, the regions of the partial images may be set in such a way that adjacent partial images overlap each other. For example, the obtaining unit 201 may divide the image into a plurality of regions. For each of one or more regions selected from the plurality regions, the obtaining unit 201 may extract a partial image from the region (center region) and the margin region surrounding the region. FIG. 5C illustrates one example of such dividing. In FIG. 5C, two adjacent partial images 505 and 506 partially overlap each other. More specifically, the partial images 505 and 506 are extracted in such a way that there is no gap between a center region 507 of the partial image 505 and a center region 508 of the partial image 506. Even if a person 510 to be detected is in a margin region 512 of the partial image 505, the person 510 can be detected from the center region 508 of the partial image 506 adjacent to the partial image 505.

Figure 5D:
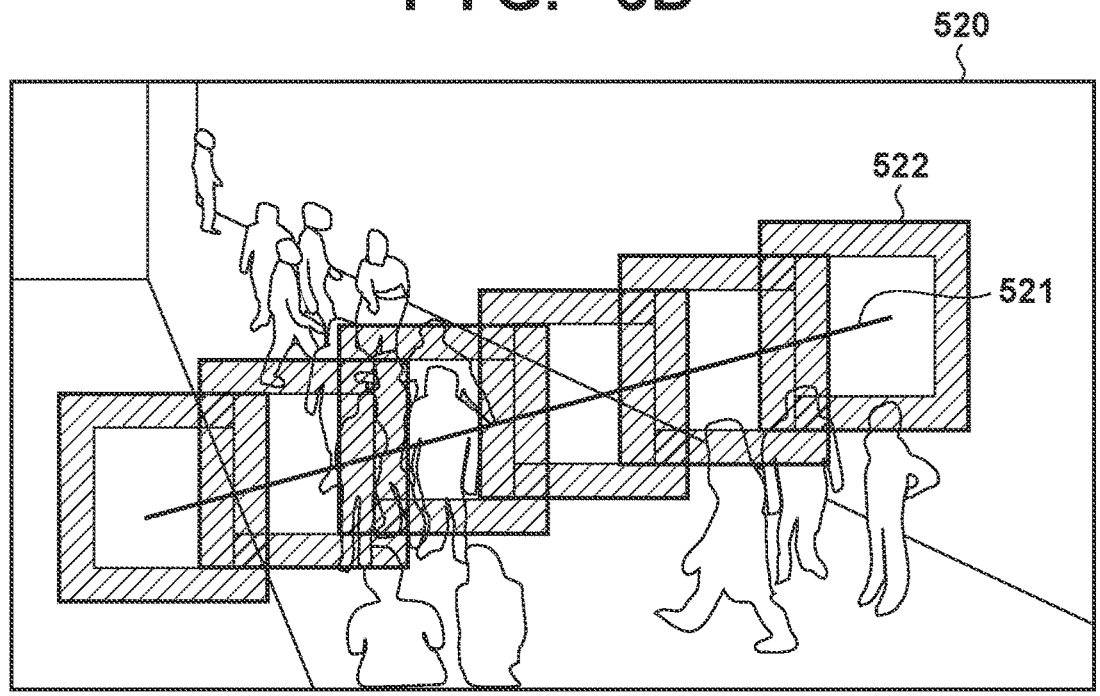

With the configuration in which the center regions of each of the partial images are adjacent to each other with no gaps therebetween as illustrated in FIG. 5C, the person to be measured can be detected in either one of the center regions of the partial images, thereby improving the accuracy of the measurement. One example of such an extraction method of the partial image is such that the input image is divided into a plurality of regions and one partial image is extracted from each of the regions (corresponding to the center region) and the margin region respectively surrounding the region. Furthermore, a dividing method capable of covering the measuring region with a requisite minimum area while securing the margin region of the partial image may be determined by optimization calculation or the like. In FIG. 5D, along the measuring region 521 being set in the input image 520, a plurality of partial images 522 each having a margin region is extracted.

In the following explanation, the word "input image" indicates the input image per se, or the partial image. That is, the processes at Steps S302 and S303 can be performed to the input image or each of the partial images in the input image.

Figure 6A:
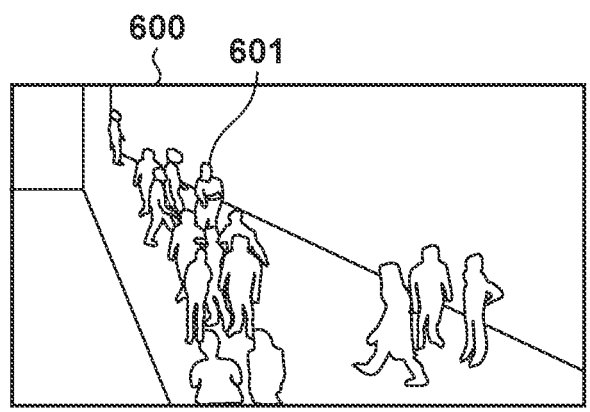
FIGS. 6A and 6B are views illustrating one example of density distribution estimation for people in the input image.
Figure 6B:
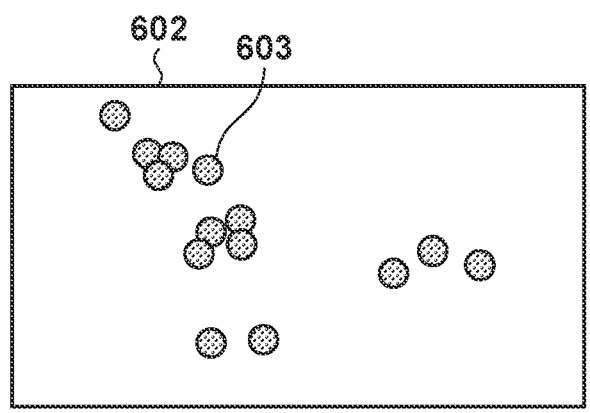

At Step S302, as described above, the density estimating unit 202 estimates the density distribution of the people to be measured, from the input image thus obtained by the obtaining unit 201. In the example illustrated in FIG. 6A, the density estimating unit 202 estimates the density distribution of the position of the head of a person 601 in an input image 600. The density estimating unit 202, as illustrated in FIG. 6B, generates a density map 602 indicating a density distribution 603 of the position of the head of the person 601.

Note that the input image used by the density estimating unit 202 is not limited to one, and the density estimating unit 202 may use a plurality of input images for estimating the density distribution. For example, the density estimating unit 202 may estimate the density distribution by inputting the plurality of input images into a neural network. The plurality of input images used by density estimating unit 202 may be, for example, images of a plurality of different frames included in a moving image. Moreover, the density distribution to be outputted by the density estimating unit 202 is not limited to one. For example, the density estimating unit 202 may be configured to output a plurality of density distributions respectively corresponding to the plurality of input image. In case where the density estimating unit 202 is configured to output a plurality of density distributions, the position estimating unit 203 in the downstream may receive all of the density distributions or receive selected one or ones of the density distributions.

Figure 7A:
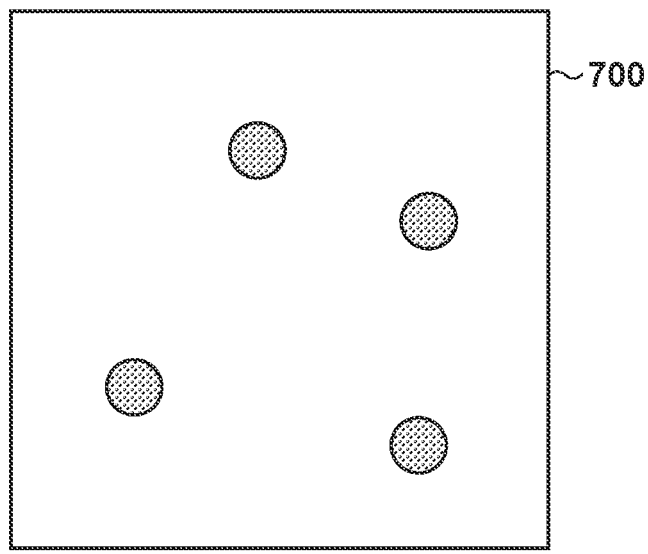
FIGS. 7A to 7C are views illustrating one example of positional coordinate estimation for people from a density distribution.
Figure 7B:
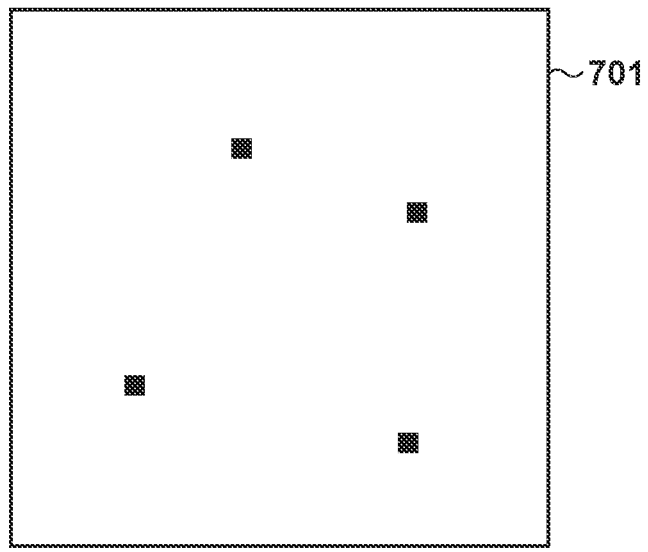

At Step S303, as described above, the position estimating unit 203 estimates the positional coordinates of people from the density distribution outputted from the density estimating unit 202. For example, the position estimating unit 203 may output a positional map 701 as illustrated in FIG. 7B, by inputting, into the neural network, a density map 700 as illustrated in FIG. 7A. The positional map 701 illustrates a case where the positional coordinates of a person match with the position of an element on the positional map 701. In this case, a value (probability value) of one element corresponding to one person becomes large. So, it is possible to determine the position of such an element can be determined as the positional coordinates of the person.

Figure 7C:
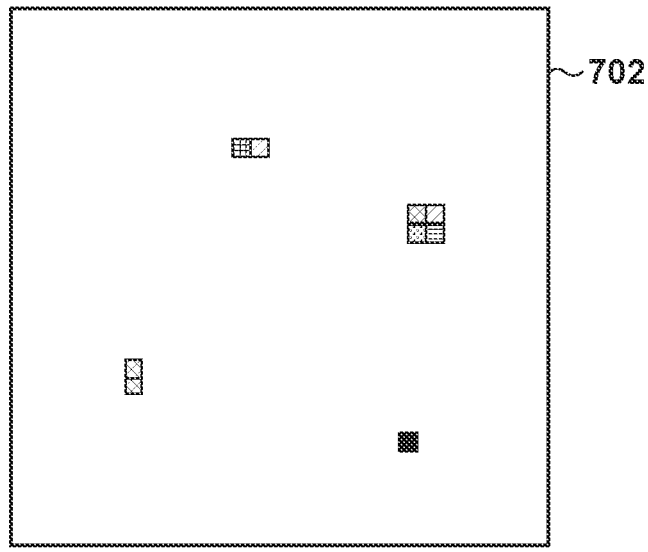

On the other hand, as exemplified in a positional map 702 illustrated in FIG. 7C, in a case where the positional coordinates of a person do not match with a position of an element on the positional map 702 (that is, a position of the latticed point), values (probability values) of a plurality of elements corresponding to one person become large. As such, there are some cases where a plurality of positions adjacent to each other on the input image are estimated as indicating a position of a target object. In this case, the position estimating unit 203 may work out the position of the target object from the plurality of positions adjacent to each other on the input image, the plurality of positions adjacent to each other having been estimated as indicating the position of the target object. For example, the position estimating unit 203 may determine the positional coordinates of the person by integrating the probability values separated between the plurality of elements into one point.

Figure 8A:
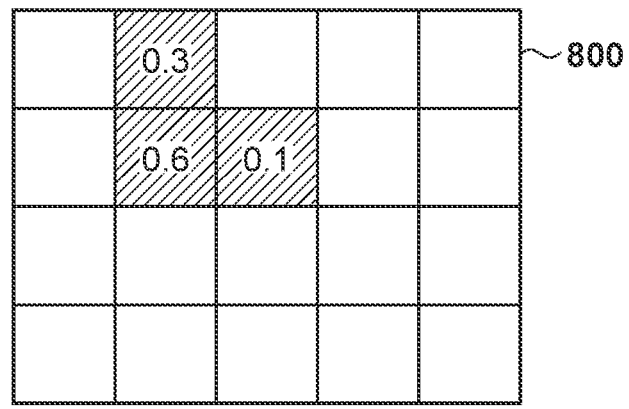
FIGS. 8A to 8C are views illustrating one example of a process for working out positional coordinates of people from a positional map.
Figure 8B:
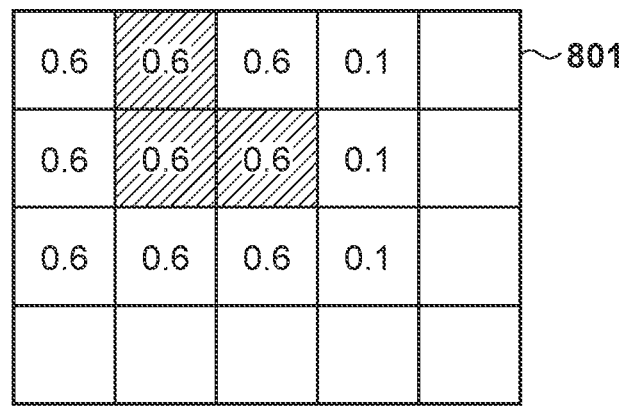
Figure 8C:
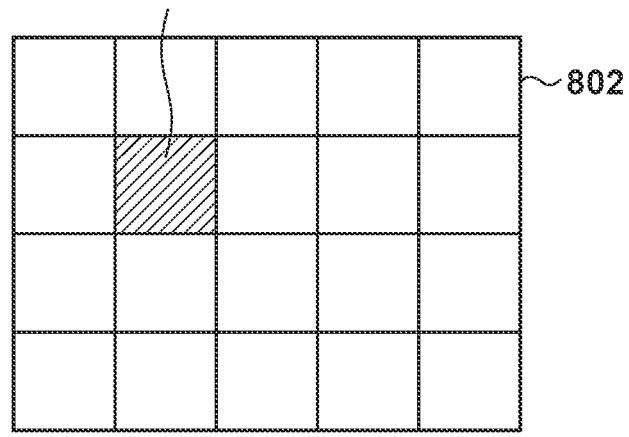

For example, as illustrated in FIGS. 8A to 8C, the position estimating unit 203 may obtain a map 801 by applying 3×3 max pooling to the positional map 800 outputted from the neural network. After that, the position estimating unit 203 may compare the positional map 800 and the map 801 for each of the elements. In this case, the position estimating unit 203 may determine, as the positional coordinates of the person, the coordinates of the elements whose value on the positional map 800 matches with the value thereof on the map 801, as illustrated on a map 802. A kernel size of the max pooling is not limited to 3×3, but may be another size such as 5×5. The process of the max pooling may be carried out solely or may be carried out by adding a max pooling layer next to an output layer of the neural network used by the position estimating unit 203.

How to integrate a plurality of probability values is not limited to this method, and the position estimating unit 203 may employ another method of detecting the maximum value, such as watershed. Moreover, the position estimating unit 203 may employ a method in which a plurality of elements with probability values detected are subjected to clustering, and coordinates of the centers of clusters are taken as the positional coordinates of people. Examples of a method of clustering include hierarchical clustering and k-means clustering. The coordinates of the centers of the clusters may be simple average of the element coordinates in the cluster, coordinates of an element with the highest probability among the elements in the cluster, or a weighted average for example by existence probability of the coordinates of the elements in the cluster.

In the positional map outputted from the neural network used by the position estimating unit 203, elements not corresponding to the positional coordinates of the people would possibly have minute probabilities, which act as noises. If the process of integrating the probability values of the adjacent elements into one point as in the example illustrated in FIGS. 8A to 8C is carried out in the presence of such noises, the coordinates of an element with minute noise would be erroneously determined as positional coordinates of a person. Thus, it may be so configured that the positional map outputted from the neural network is corrected so that the minute probabilities that are equal to or less than a threshold to be deemed as noises are corrected to zero, and the position estimating unit 203 performs the process of integrating the probability values to one point, and determination of the positional coordinates of the people.

Figure 9:
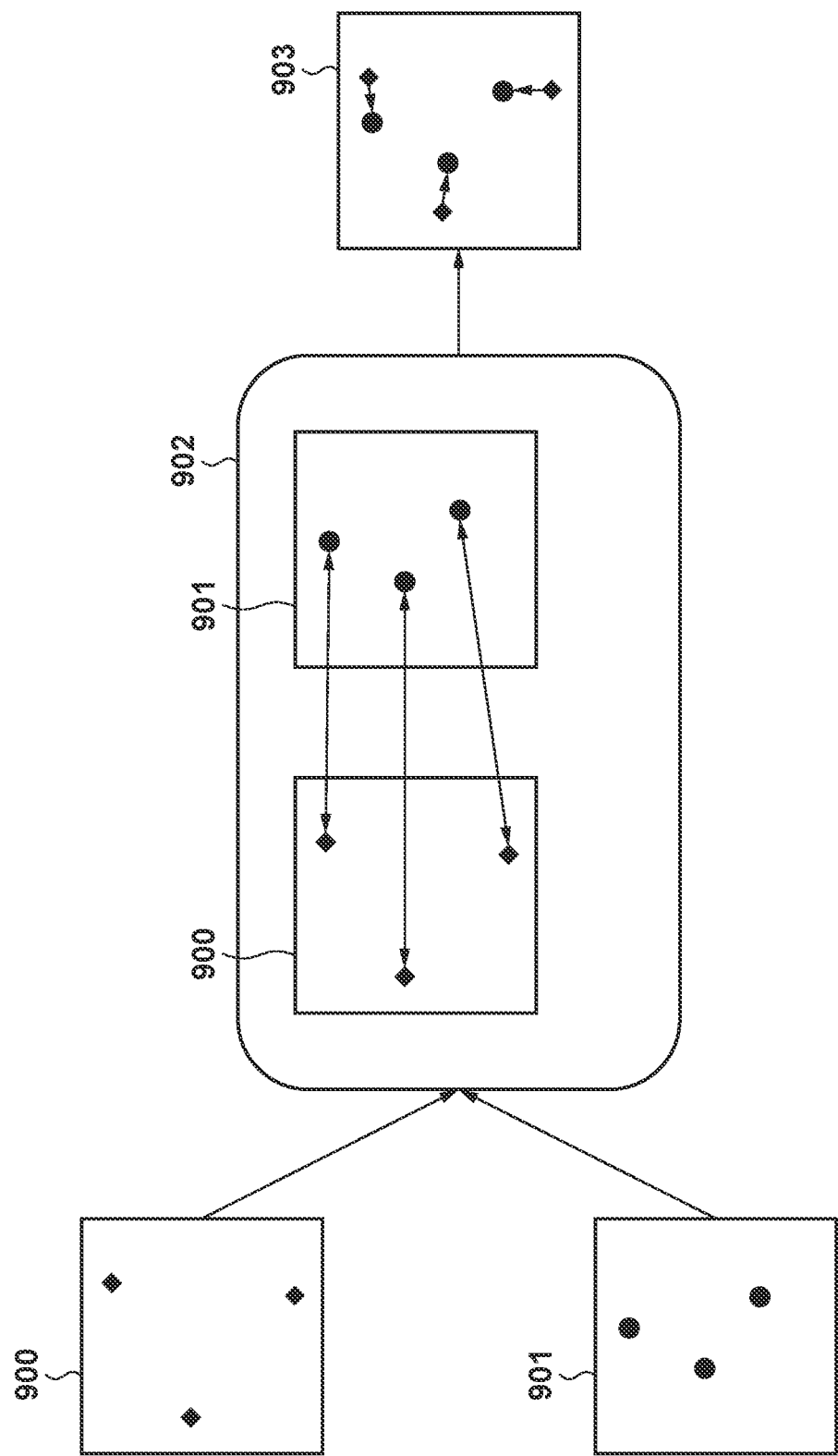
FIG. 9 is a view illustrating a matching method for matching positional coordinates of a person at different times.

At Step S304, the tracking unit 204 tracks the positional coordinates of the people on the basis of the positional coordinates outputted by the position estimating unit 203. As described above, by performing the processes of Steps S302 and S303 to each of the input images captured at different times, it is possible to obtain a positional coordinates list of the people included in the input images captured at the different times. FIG. 9 illustrates a positional coordinates list 900 for Time $t_1$ and a positional coordinates list 901 for Time $t_2$ that is later than the Time $t_1$. On the positional coordinates lists 900 and 901, the positions of the people detected from the input images are shown. The tracking unit 204 can obtain movement loci 903 of the people from the Time $t_1$ to Time $t_2$ by performing matching 902 (associating) of the positions of the people between the positional coordinates list 900 and the positional coordinates list 901.

The matching is not limited to a particular method. For example, the tracking unit 204 may perform the matching in such a way as to reduce a sum total of costs calculated out based on a result of the matching. Examples of algorithms to perform the matching include Hungarian matching, linear programming, neural network, and the like. Examples of costs that are referable include distances between people, and the like. Moreover, a cost based on similarities of image information of the people between the input image may be used. Furthermore, more than one type of costs may be used, and a combination of costs of plural documents may be used. For example, the cost may be calculated out based on both of the distances between the people and the similarities of the image information of the people between the input images. The tracking unit 204 may perform the matching in such a way that such cost will be minimized.

In the following, an example in which the distances between the people are used as the cost will be described, referring to FIGS. 10A-10C. An input image 1000 illustrated in FIG. 10A indicates the positional coordinates A, B, and C of persons. Moreover, from an image of a preceding frame preceding the input image 1000, positional coordinates b, c, dare detected. Note that, in this example, the positional coordinates b and the positional coordinates B are positional coordinates of a person, and the positional coordinates c and the positional coordinates C are positional coordinates of another person. Thus, matching results including positional coordinates combinations (b, B) and (c, C) are correct.

On the other hand, if the tracking unit 204 performs the matching in such a way that the sum total of the distances between the people will be minimized, there is a possibility that positional coordinates combinations (c, B) and (b, C) are obtained. In view of this, the tracking unit 204 may be configured to define the cost in such a way that a sum of a cost corresponding to a distance bB and a cost corresponding to a distance cC will be smaller than a sum of a cost corresponding to a distance cB and a cost corresponding to a distance Cb. In one embodiment, the cost for a distance d is smaller than a half of a cost corresponding to a distance 2d. For example, the cost may be defined by using such a scale of a distance that emphasizes the long distance Cb. Examples of such a scale of distance include square Euclidean distance, and the like.

Moreover, the person pictured at the positional coordinates A on the input image 1000 was present at the positional coordinates a out of an image capturing range when capturing the image of the preceding frame, and this person moved into the image capturing range when capturing the input image 1000. Further, the person pictured at the positional coordinates d in the image of the preceding frame moved to the positional coordinates D out of the image capturing range when the input image 1000 was captured. In such a case, the positional coordinates a and D to be matched with the positional coordinates A and d are not detected in the input image 1000 and the image of the preceding frame. In such a case, if all the positional coordinates detected within the image capturing range of the input image 1000 are matched in such a way that the sum total of the distances between the people will be minimized, there is a possibility that incorrect matching results would be erroneously obtained. For example, in the example illustrated in FIG. 10A, positional coordinates combinations (A, b), (B, c), and (C, d) would be erroneously obtained.

In one embodiment, the tracking unit 204 may be configured to perform the matching in such a way that isolate positional coordinates such as the positional coordinates A and d would not be matched. For example, a maximum distance r for matching may be set. In this case, the tracking unit 204 can perform the matching in such a way that positional coordinates distanced more than the maximum distance r would not be matched.

Figures 10A, 10B, 10C:
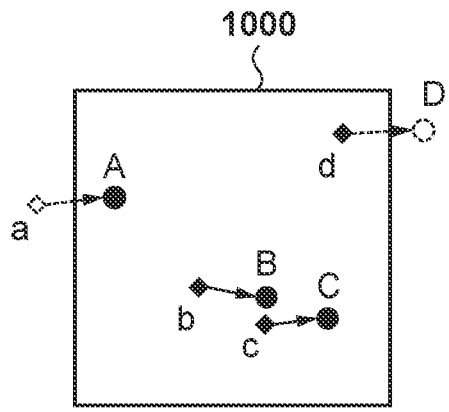
FIGS. 10A to 10C are views illustrating examples of a cost matrix used for the matching, and matching results.

FIGS. 10B and 10C illustrate examples of a cost matrix for Hungarian matching to avoid matching of isolate positional coordinates, and matching result. In FIGS. 10B, B, C, b, and c correspond to the positional coordinates B, C, b, and c in FIG. 10A, respectively. The positional coordinates A and dare isolate positional coordinates that distanced from all the other positional coordinates by a distance equal to or longer than the maximum distance r. Therefore, in order to avoid that the positional coordinates A and d are matched with the other positional coordinates, the costs regarding the positional coordinates A and d are excluded from the cost matrix illustrated in FIG. 10B. The tracking unit 204 may generate such a cost matrix, for example, on the basis of the square Euclidean distance. In the example of FIG. 10B, the positional coordinates combinations (B, b) and (C, c) highlighted with thick frames are obtained in such a manner that the sum total of the costs will be minimized.

In another example illustrated in FIG. 10C, A, B, C, b, c, and d correspond to the positional coordinates A, B, C, b, c, and d illustrated in FIG. 10A (hereinafter, which are referred to as actual coordinates). In the example illustrated in FIG. 10C, at the beginning, the tracking unit 204 generates the cost matrix of the actual coordinates on the basis of, for example, square Euclidean distance. Next, the tracking unit 204 adds three dummies as many as the positional coordinates A. B, and C, which are the actual coordinates detected from the input image 1000, that is, columns corresponding to X 1, X 2, and X 3. Furthermore, the tracking unit 204 adds three dummies as many as the positional coordinates b, c, and d, which are the actual coordinates detected from the image of the preceding frame, that is, columns corresponding to X 1, X 2, and X 3. After that, the tracking unit 204 sets a cost between the dummy and arbitrary actual coordinates by using a value $r_1$ that is larger than the maximum distance r, and sets a cost between actual coordinates with a distance longer than the maximum distance r therebetween by using a value $r_2$ that is larger than the value $r_1$. That is, $r<r_1<r_2$. The tracking unit 204 may generate such a cost matrix on the basis of, for example, square Euclidean distance. By performing the matching by using such a cost matrix, the isolate actual coordinates will not be matched with the other actual coordinates, but with the dummies. Moreover, the excess dummies will be matched with each other. In FIG. 10C, the result of matching performed by using the cost matrix is indicated with a thick frame. The tracking unit 204 can obtain the matching result, by excluding the matching result with these dummies.

In still another example, the tracking unit 204 may be configured such that, before performing the matching, the positional coordinates distanced from each other within the maximum distance r are grouped with each other. In this case, the tracking unit 204 can perform the matching group by group, so that the positional coordinates in the same group are matched with each other. For example, the tracking unit 204 may generate a cost matrix as illustrated in FIG. 10B or 10C for each group individually, and perform the matching with the cost matrixes. The isolate positional coordinates A and d as illustrated in FIG. 10A will be excluded by such grouping. By such a method, it is possible to improve the process speed in case where the number of people, that is, the number of the positional coordinates detected is large. The grouping is not limited to a particular method, but examples of the method of grouping include a method in which an unlinked independent graph is searched by using a cost matrix or adjacent graphs including isolate positional coordinates. Moreover, it is possible to use a clustering method such as hierarchical clustering or k-means clustering.

As described above, the tracking unit 204 can match the positional coordinates of a person detected from the input image with the positional coordinates of the person detected from the image captured at previous time. On the other hand, the tracking unit 204 may perform the matching by referring to a matching result previously obtained.

Figure 11:
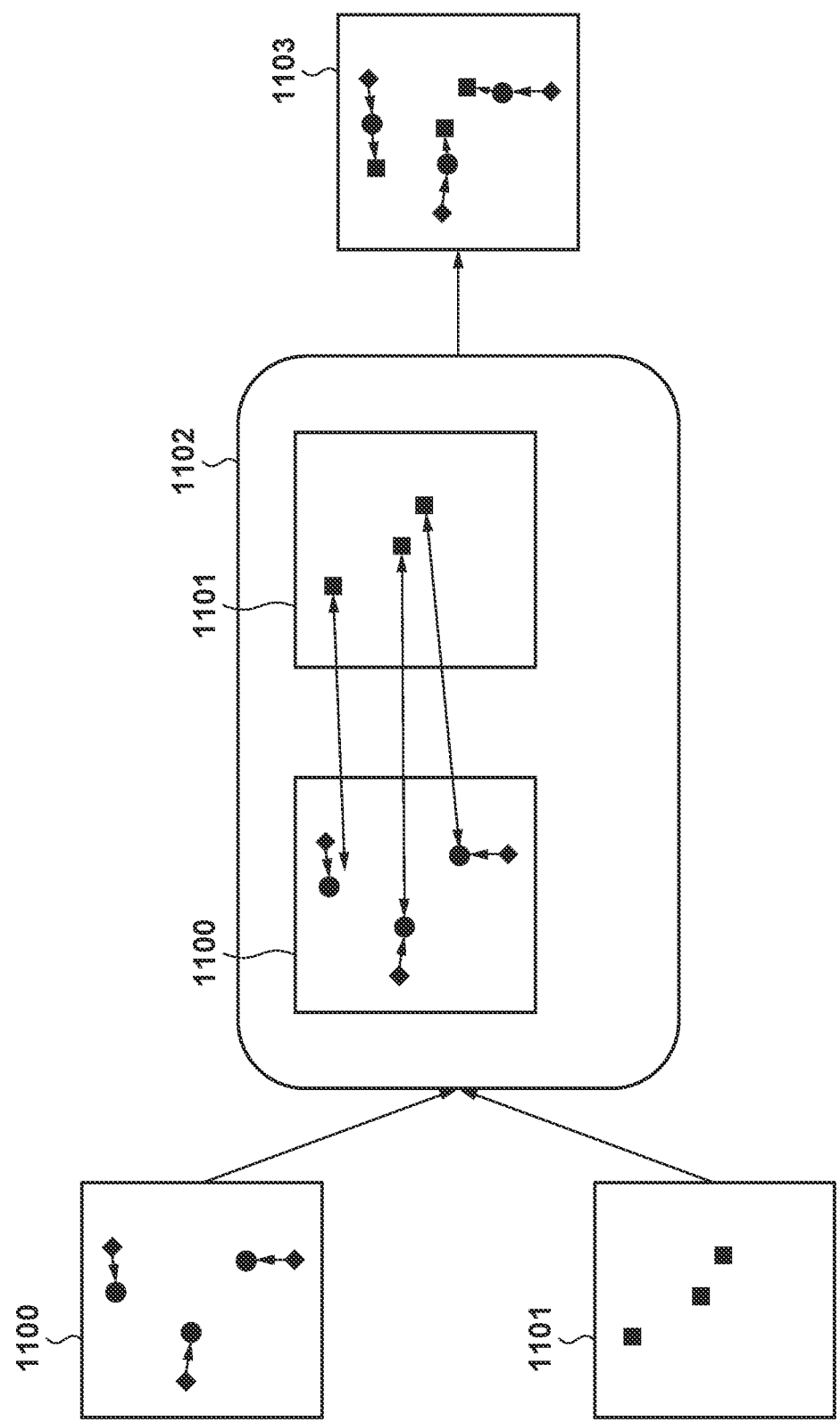
FIG. 11 is a view illustrating one example of a process for working out a movement locus of a person by matching.

In one embodiment, the tracking unit 204 is configured to match positional coordinates at Time $t_2$ with positional coordinates at Time ta later than Time $t_2$, by referring to a matching result of matching positional coordinates at Time $t_1$ with the positional coordinates at Time $t_2$. For example, in the example of FIG. 11, the tracking unit 204 performs matching 1102 for matching a matching result 1100 of matching the positional coordinates between Time $t_1$ and Time $t_2$, with a positional coordinates list 1101 for Time $t_3$. By such a process, it is possible to obtain movement locus 1103 of a person from Time $t_1$ to Time $t_2$, and to Time $t_3$. By repeating such a process for positional coordinates for later times, it is possible to obtain a movement locus of the same person for a longer time.

The tracking unit 204 may perform the matching by performing this process in such a way that, in addition to the positional coordinates at Time $t_2$, and the positional coordinates at Time $t_3$, using a moving direction or a moving speed of the person at Time $t_2$. That is, the tracking unit 204 may perform the matching by matching the positional coordinates at Time $t_2$ preferentially with such positional coordinates at Time $t_3$ that are not in contradiction with the moving direction or moving speed of the person at Time $t_2$.

For example, the tracking unit 204 may be configured to predict the position of a target object in the input image at Time ta, at least on the basis of the position of the target object in the input image at Time $t_3$. FIG. 12A indicates one example of the movement of the positional coordinates of a person between Time $t_2$ and Time $t_3$. In this example, positional coordinates b and c are detected at Time $t_2$ and positional coordinates B and C are detected at Time $t_3$. In this case, the persons are so closed, there is a possibility that an erroneous matching (B, c) would be obtained. The tracking unit 204 performs the matching by using a predictive positional coordinates b* and c* of the persons at Time ta, as illustrated in FIG. 12B, thereby making it possible to improve the matching accuracy.

The tracking unit 204 may calculate out the predictive positional coordinates b* and c* of the persons at Time $t_3$ from the movement loci at time preceding Time $t_3$. For example, the tracking unit 204 may calculate out the predictive positional coordinates b* and c* of the persons by using moving loci obtained by the matching results at and before Time $t_2$. In the example illustrated in FIG. 12B, the positional coordinates b' at Time $t_1$ and the positional coordinates b at Time $t_2$ are matched with each other, and the positional coordinates c' at Time $t_1$ and the positional coordinates c at Time $t_2$ are matched with each other. In this example, the tracking unit 204 can work out the predictive positional coordinates 1202 (b*, c*) at Time $t_3$ from the movement loci 1201 from Time $t_1$ to Time $t_2$. The calculation of the predictive positional coordinates is not limited to a particular method. For example, the tracking unit 204 may calculate out the predictive positional coordinates at Time $t_3$ by using the positional coordinates at Time $t_1$ and Time $t_2$ by linear extrapolation.

According to the method described above, the tracking unit 204 performs the matching 1204 for matching the predictive positional coordinates 1202 (b*, c*) with the detected positional coordinates 1203 (B, C) at Time $t_3$. In this way, instead of the detected positional coordinates b and c at Time $t_2$, the tracking unit 204 matches the predictive positional coordinates b* and c* at Time $t_3$ with the detected positional coordinates B and C at Time $t_3$. According to this method, it is possible to improve the matching accuracy, because it is expected that the predictive positional coordinates b* and c* are more approximate to the positional coordinates B and C than the positional coordinates b and c are. Based on the matching result of matching the predictive positional coordinates b* and c* with the positional coordinates B and C, the tracking unit 204 can match the positional coordinates B and C with the positional coordinates b and c. In this way, movement loci 1205 from Time $t_1$ to Time $t_2$ and to Time $t_3$ can be obtained.

Note that, the calculation of the predictive positional coordinates at Time $t_3$ may use positional coordinates at plural times preceding Time $t_3$ instead of using the positional coordinates at two times (Time $t_1$ and Time $t_2$).

Figure 13A:
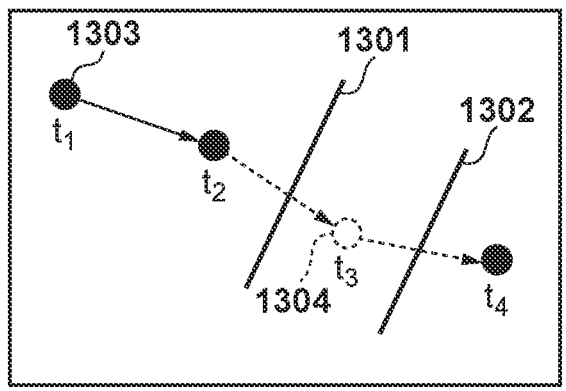
FIGS. 13A and 13B are views illustrating a method for compensating a movement locus if the movement locus is failed to continue.
Figure 13B:
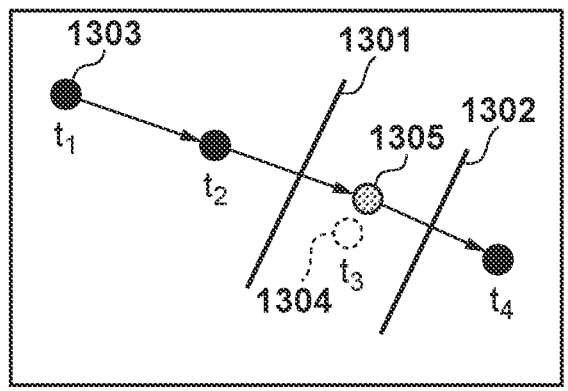

There is a possibility that, for some reasons, the input image to be provided to the obtaining unit 201 is lost, the density distribution of the people by the density estimating unit 202 is lost, or the position estimating unit 203 fails to detect positional coordinates of a person. For example, as in an example illustrated in FIG. 13A, a position 1304 of a person at Time t is not detected but redetected at Time $t_4$. In case where a movement locus of a person is failed to continue, it would be erroneously determined that the person did not cross lines 1301 and 1302 indicating a measuring region. In order to avoid such a phenomenon, as shown in FIG. 13B, the tracking unit 204 may compensate the failed-to-continue movement locus by using predictive positional coordinates 1305 at Time $t_3$. By such a method, even if a movement locus is failed to continue, it is possible to determine that a person crossed the measuring region. The predictive positional coordinates 1305 at Time $t_3$ can be calculated out as described above.

For example, the tracking unit 204 may predict that the person is present at the predictive positional coordinates 1305 at Time $t_3$, and generate the movement locus of the person crossing the predictive positional coordinates 1305 on the basis of the prediction. Note that the tracking unit 204 may exclude the predictive positional coordinates 1305 from the movement locus if the movement locus thus generated does not match with positional coordinates detected after Time $t_3$.

The estimation of the positional coordinates of a person for the case where the movement locus of the person is failed to continue is not limited to the method described above. For example, the tracking unit 204 may perform the estimation of the positional coordinates of the person by using a target object tracking method such as template matching. Furthermore, even if the failure of detecting the positional coordinates of the person occurs over two or more frames, it is possible to track the movement locus of the person by repeating the calculation of the predictive positional coordinates.

Furthermore, the tracking unit 204 may be configured to match the positional coordinates of a person at Time $t_2$ and the positional coordinates of a person at Time $t_4$. In this case, the tracking unit 204 may calculate out the predictive positional coordinates of the person at Time t from the positional coordinates of the person at Time $t_2$ (and time preceding Time $t_2$ such as Time $t_1$). As described above, by matching these predictive positional coordinates with the positional coordinates of the person detected at Time $t_4$, it is possible to match the movement locus of the person until Time $t_2$ with the positional coordinates of the person detected at Time $t_4$. In this case, it is possible to calculate out the movement locus of the person to the positional coordinates detected at Tune $t_4$ from the positional coordinates detected at Time $t_2$. In this case, the tracking unit 204 may further calculate out predictive positional coordinates of the person at Time $t_3$. Further, the tracking unit 204 may calculate out movement locus of the person from the positional coordinates detected at Time $t_2$ to the positional coordinates detected at Time $t_4$ via the predictive positional coordinates of the person at Time $t_3$.

Note that, in the example illustrated in FIG. 9, the positional coordinates lists 900 and 901 for use in matching are such that the persons corresponding to the respective positions are not specified. However, the persons corresponding to the respective positions may be specified by image recognition process or the like. In this case, the tracking unit 204 may perform the matching by matching the positional coordinates of the person at different times, referring to the information for recognizing the person.

At S305, the measuring unit 205 measures the flow rate of the people on the basis of the movement loci of the people outputted from the tracking unit 204. For example, the measuring unit 205 can measure the flow rate of the people by determining whether or not the movement loci of the people outputted from the tracking unit 204 crossed the preset measuring region. Note that, the setting method of the measuring region is as described above. As explained referring to FIGS. 4A and 4B, the measuring regions 401 and 403 may be set in setting the region from which the partial image is to be extracted at Step S301.

Figure 14A:
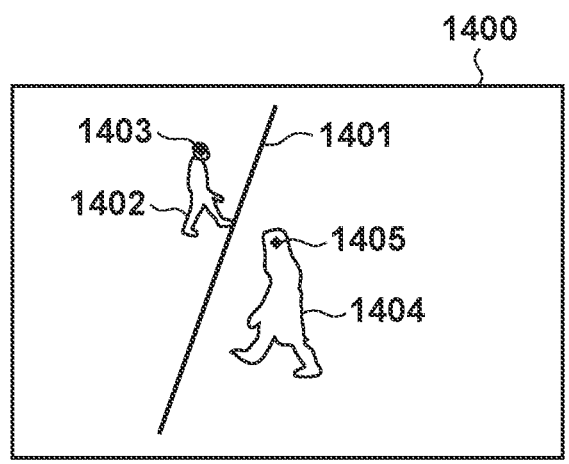
FIGS. 14A and 14B are views illustrating one example of a method for measuring a flow rate from the movement locus of people.
Figure 14B:
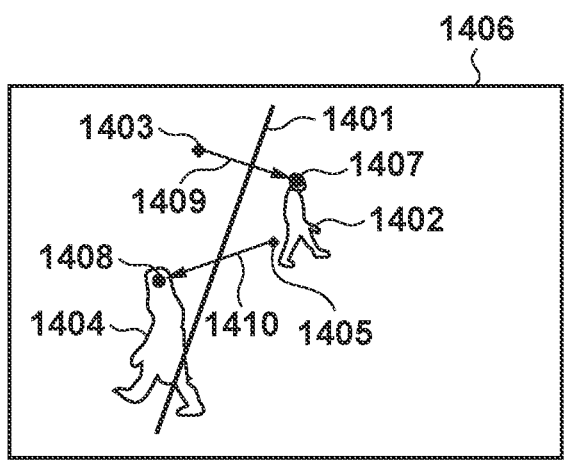

One example of the method of measuring the flow rate of the people in case where the measuring region is linear will be described herein, referring to FIGS. 14A-14B. FIG. 14A illustrates an input image 1400 at Time $t_1$ and a line 1401 serving as a measuring region. Moreover, from the input image 1400, positional coordinates 1403 of a person 1402 and positional coordinates 1405 of a person 1404 are detected. Similarly, FIG. 14B illustrates an input image 1406 at Time $t_2$. From the input image 1406, positional coordinates 1407 of the person 1402, and a movement locus 1409 from the positional coordinates 1403 to the positional coordinates 1407 are detected. Moreover, from the input image 1406, positional coordinates 1408 of the person 1404, and a movement locus 1410 from the positional coordinates 1405 to the positional coordinates 1408 are detected.

The measuring unit 205 in the example illustrated in FIG. 14B can determine that the movement locus 1409 crosses the line 1401, and therefore can determine that the person 1402 passed the line 1401. Similarly, the measuring unit 205 can determine that the movement locus 1410 also crosses the line 1401, and therefore can determine that the person 1404 also passed the line 1401. In this case, the measuring unit 205 may determine that the person 1404 crossed the line 1401 in a direction opposite to a direction in which the person 1402 crossed the line 1401. The determination of the crossing of the movement locus and the line may be carried out, for example by a geometrical method such as crossing determination of a line and a line.

In one embodiment, in a case where a person moves from one of regions separated by the measuring region to the other one of the regions, the measuring unit 205 determines that the person crossed the measuring region. On the other hand, the measuring unit 205 does not determine that the person crossed the measuring region, while the person is present on the measuring region. That is, the measuring unit 205 measures the number of the people moved from the one of regions to the other one of the regions across the measuring region, but the number of people thus measured does not include the number of people moved from the one of regions to the measuring region but not yet moved to the other region.

Figure 15:
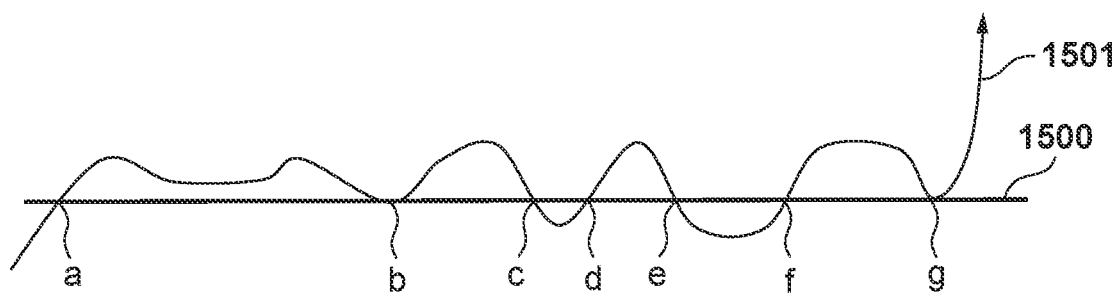
FIG. 15 is a view illustrating one example of a method for measuring a flow rate from the movement locus of people.

For example, FIG. 15 illustrates a line 1500 serving as a measuring region and a movement locus 1501 of a person. In this example, the measuring unit 205 can determine that, at the three points a, d, and f, the person crossed the line 1500 from below to above, and can determine that, at the two points c and e, the person crossed the line 1500 from above to below. On the other hand, the measuring unit 205 can determine that the person did not cross the line 1500 at b and g at which the person is right on the line 1500. As described above, the line 1500 may be a line with a large thickness (that is, a rectangular region), and in this case, the measuring unit 205 does not determine that the person crossed the line 1500, while the person is still on the line 1500.

By doing such determination for each of the movement loci of the people, the measuring unit 205 can measure the flow rate of the people. In the example illustrated in FIG. 15, the measuring unit 205 can measure the accumulative number of crossing the line 1500 from below to above and the accumulative number of crossing the line 1500 from above to below as the flow rates of the people in the respective directions. Here, by determining that the person did not cross the measuring region while the person is still on the measuring region as explained referring to FIG. 15, it is possible to avoid overlapped counting of the accumulative number of crossing, which would be caused due to minute movement of the people around the measuring region.

The measuring unit 205 may be configured to calculate out, as the flow rate of people, a difference between the accumulative numbers of crossing of each person in the respective movement directions across the measuring regions. More specifically, the measuring unit 205 may calculate out a difference between the number of people crossed the measuring region from one of the regions to the other one of the regions, and the number of people crossed the measuring region from the other one of the regions to the one of the regions. For example, in the case of FIG. 15, as to the person represented by the movement locus 1501, the accumulative number of crossing the line 1500 from below to above is three times, and the accumulative number of crossing the line 1500 from above to below is two times. The measuring unit 205 can determine that one person passed the line 1500 from below to above by calculating out the difference between the accumulative numbers of crossing in the respective movement directions.

As described above, the shape of the measuring region is not particularly limited. For example, if the measuring region is a closed curve surrounding a certain region, the measuring unit 205 may measure a flow rate of people going into the measuring region and a flow rate of people going out of the measuring region.

According to the present embodiment, even if a target object overlaps with another target object in an image, the density distribution is estimated and the position of the target object is estimated from the density distribution. Thus, compared with the configuration in which the target objects are directly detected from the image as in Japanese Patent Laid-Open No. 2007-201556, the configuration according to the present embodiment can improve position estimation accuracy of the target objects in a crowded scene. Moreover, because the positional map indicative of the position estimation result is highly sparse (for example, the values are zero for the most of the positions), it may not be easy to perform the position estimation of the target objects directly from the image by using the neural network. On the other hand, according to the present embodiments, it is possible to obtain the position estimation result by solving the two-class classification problem for each position on the density map, thereby making the position estimation easier. In one embodiment, for attaining these effects, the obtaining unit 201, the density estimating unit 202, and the position estimating unit 203 perform the processes at Steps S301 to S303, whereas the processes at Steps S304 and S305 by the tracking unit 204 and the measuring unit 205 may be optionally omittable.

Moreover, according to the present embodiments, the positional coordinates of the target objects are tracked between frames, thereby making it possible to measure the flow of the target objects with good accuracy. In one embodiment, for attaining such effects, the tracking unit 204 and the measuring unit 205 perform the processes at Steps S304 and S305 whereas the processes at Steps S301 to S303 by the obtaining unit 201, the density estimating unit 202, and the position estimating unit 203 may be optionally omittable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-168734, filed Sep. 17, 2019, which is hereby incorporated by reference herein in its entirety.

What is claimed is:

1. An image processing apparatus comprising:
a processor that executes instructions to:
   a plurality of images;
   estimate a density distribution of a target object based on at least one image, among the plurality of images;
   estimate a position of the target object in each of the plurality of images based on the density distribution, by performing, for each position on each of the plurality of images, two-class classification for distinguishing whether or not the each position indicates a representative point of the target object; and
   count the number of target objects moved from a first region to a second region based on the positions of the target objects in the plurality of images.

2. The image processing apparatus according to claim 1, wherein the density distribution indicates a region in each of the plurality of images where the target object is estimated to present.

3. The image processing apparatus according to claim 1, wherein the processor estimates the positions of the target object using a neural network.

4. The image processing apparatus according to claim 1, wherein the processor further executes the instructions to calculate the position of the target object on the basis of a plurality of positions in each of the plurality of images estimated to indicate the position of the target object, the plurality of positions being adjacent to each other.

5. The image processing apparatus according to claim 1, wherein:
the processor executes the instructions to extract, from each of the plurality of images, one or more partial images each being part of an image, among the plurality of images, and
the processor estimates the density distribution of the target object in each of the one or more partial images.

6. The image processing apparatus according to claim 5, wherein the processor extracts the one or more partial images from each of the plurality of images in such a way that the one or more partial images include a measuring line between the first and second regions.

7. The image processing apparatus according to claim 6, wherein the processor executes the instructions to obtain a designation of the measuring region by a user, and set, based on the designation, a region from which the one or more partial images are to be extracted.

8. The image processing apparatus according to claim 5, wherein the processor executes the instructions to divide the image into a plurality of regions, and to extract, for each of one or more regions selected from the plurality of regions, the one or more partial images at the each region and a margin region around the each region.

9. The image processing apparatus according to claim 1, wherein:
the processor executes the instructions to generate a density map of each of the plurality of images, the density map indicating a density of the target object at each position on each of the plurality of images, and
the processor performs, for each position on the density map, the two-class classification.

10. The image processing apparatus according to claim 1, wherein the first and second regions are separated by a measuring line.

11. The image processing apparatus according to claim 10, wherein the processor counts the number of target objects moved from the first region to the second region across the measuring line while excluding, from the number of target objects, the number of target objects moved from the first region to the measuring line but not to the second region.

12. The image processing apparatus according to claim 10, wherein the processor calculates a difference between the number of target objects moved from the first region to the second region and the number of target objects moved from the second region to the first region.

13. The image processing apparatus according to claim 1, the processor executes the instructions to associate a position of the target object in a first image at a first time, among the plurality of images, with a position of the target object in a second image at a second time, among the plurality of images.

14. The image processing apparatus according to claim 13, wherein the processor executes the instructions to:
predict a position of the target object in a third image at a third time later than the second time, at least on the basis of the position of the target object in the second image; and
associate the position of the target object in the second image with the position of the target object in the third image on the basis of the predicted position of the target object in the third image at the third time and the position of the target object in the third image.

15. The image processing apparatus according to claim 1, wherein the processor estimates the density distribution using a neural network.

16. A non-transitory computer-readable medium storing a program executable by a computer to perform a method comprising:
obtaining a plurality of images;
estimating a density distribution of a target object based on at least one image, among the plurality of images;
estimating a position of the target object in each of the plurality of images based on the density distribution by performing, for each position on each of the plurality of images, two-class classification for distinguishing whether or not the each position indicates a representative point of the target object; and
counting the number of target objects moved from a first region to a second region based on the positions of the target objects in the plurality of images.

17. An image processing method comprising:
obtaining a plurality of images;
estimating a density distribution of a target object based on at least one image, among the plurality of images;
estimating a position of the target object in each of the plurality of images based on the density distribution by performing, for each position on each of the plurality of images, two-class classification for distinguishing whether or not the each position indicates a representative point of the target object; and
counting the number of target objects moved from a first region to a second region based on the positions of the target objects in the plurality of images.

* * * * *